(12) United States Patent
Sako et al.

(10) Patent No.: US 7,673,154 B2
(45) Date of Patent: Mar. 2, 2010

(54) RECORDING MEDIUM, RECORDING METHOD, INFORMATION TRANSMISSION METHOD, TERMINAL DEVICE, AND SERVER DEVICE

(75) Inventors: Yoichiro Sako, Tokyo (JP); Shunsuke Furukawa, Tokyo (JP); Yoriaki Kanada, Kanagawa (JP); Koichi Nakajima, Chiba (JP); Akiya Saito, Kanagawa (JP); Etsuo Shibasaki, Tokyo (JP); Kaoru Kijima, Tokyo (JP); Akiko Inoue, Saitama (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 1211 days.

(21) Appl. No.: 10/488,227

(22) PCT Filed: Jul. 2, 2003

(86) PCT No.: PCT/JP03/08422

§ 371 (c)(1),
(2), (4) Date: Mar. 2, 2004

(87) PCT Pub. No.: WO2004/006250

PCT Pub. Date: Jan. 15, 2004

(65) Prior Publication Data

US 2004/0233832 A1    Nov. 25, 2004

(30) Foreign Application Priority Data

Jul. 2, 2002 (JP) ............................. 2002-193680
Aug. 29, 2002 (JP) ............................. 2002-251683

(51) Int. Cl.
*G06F 7/04* (2006.01)
*G06F 17/30* (2006.01)
*H04N 7/16* (2006.01)
*B41K 3/38* (2006.01)
*H04N 7/167* (2006.01)
*G06F 11/30* (2006.01)
*G06F 12/14* (2006.01)

(52) U.S. Cl. ............................ 713/193; 726/27; 726/31; 380/59; 380/200

(58) Field of Classification Search ................... 713/193
See application file for complete search history.

(56) References Cited

U.S. PATENT DOCUMENTS 6,453,420 B1 * 9/2002 Collart .................... 726/26

(Continued)

FOREIGN PATENT DOCUMENTS

EP 0 751 517 A2 1/1997

(Continued)

OTHER PUBLICATIONS

U.S. Appl. No. 10/490,210, filed Mar. 30, 2004, Sako et al.

(Continued)

*Primary Examiner*—Nasser G Moazzami
*Assistant Examiner*—Oscar A Louie
(74) *Attorney, Agent, or Firm*—Oblon, Spivak, McClelland, Maier & Neustadt, L.L.P.

(57) ABSTRACT

A recording medium including at least a lead-in region, a recording region in which information is recorded, and a lead-out region. In this configuration, medium information including medium identification information and relevant information is recorded in at least any one of the lead-in region, the recording region, and the lead-out region.

25 Claims, 11 Drawing Sheets

U.S. PATENT DOCUMENTS

| | | | |
|---|---|---|---|
| 6,694,023 B1 * | 2/2004 | Kim | 380/203 |
| 6,952,479 B2 * | 10/2005 | Shavit et al. | 380/201 |
| 7,200,085 B2 | 4/2007 | Kanda et al. | |
| 2002/0025039 A1 | 2/2002 | Kato et al. | |
| 2002/0129254 A1 * | 9/2002 | Kuroda | 713/176 |
| 2003/0182565 A1 * | 9/2003 | Nakano et al. | 713/193 |

FOREIGN PATENT DOCUMENTS

| | | |
|---|---|---|
| EP | 0 772 192 A2 | 5/1997 |
| EP | 0 807 929 A1 | 11/1997 |
| EP | 0 809 244 A2 | 11/1997 |
| EP | 0 915 410 A2 | 5/1999 |
| EP | 0 923 076 A1 | 6/1999 |
| EP | 923076 A1 * | 6/1999 |
| EP | 1 018 733 A1 | 7/2000 |
| EP | 1 204 111 A1 | 5/2002 |
| JP | 63-251938 | 10/1988 |
| JP | 7-296508 | 11/1995 |
| JP | 8-69294 | 3/1996 |
| JP | 8-101694 | 4/1996 |
| JP | 9-017119 | 1/1997 |
| JP | 9-17119 | 1/1997 |
| JP | 9-34841 | 2/1997 |
| JP | 9-55025 | 2/1997 |
| JP | 11-143719 | 5/1999 |
| JP | 11-312175 | 11/1999 |
| JP | 2000-010876 | 1/2000 |
| JP | 2000-222729 | 8/2000 |
| JP | 2001-23350 | 1/2001 |
| JP | 2001-28727 | 1/2001 |
| JP | 2001-243636 | 9/2001 |
| JP | 2002-73396 | 3/2002 |
| JP | 2002-124027 | 4/2002 |
| JP | 2002-132735 | 5/2002 |
| JP | 2002-344887 | 11/2002 |
| WO | WO 00/21087 | 4/2000 |
| WO | WO 01/88917 A1 | 11/2001 |

OTHER PUBLICATIONS

U.S. Appl. No. 10/486,920, filed Feb. 24, 2004, Sako et al.

Wataru Sawakawa, Akihiro Tsunashima, TCP/IP Kaiseki to Socket Programming, Ohmsha, Ltd., Feb. 25, 2000, pp. 22 to 30.

* cited by examiner

FIG. 3

| SERIAL No. | REPRODUCIBLE TITLE INFORMATION | ATTRIBUTE INFORMATION | DISC CLASSIFICATION | ECC |
|---|---|---|---|---|

FIG. 4

| REPRODUCIBLE TITLE INFORMATION | | KEY INFORMATION PREPARED AT MANAGING SERVER | |
|---|---|---|---|
| CODE (8 BITS) | NUMBER OF PREPAID MELODIES (NUMBER OF REPRODUCIBLE MELODIES) | ENCRYPTION KEY | (SECRET KEY) |
| 0 0 0 0 0 0 0 0 | NOT PROVIDED | NOT PROVIDED | NOT PROVIDED |
| 0 0 0 0 0 0 0 1 | PATTERN 1 (10 MELODIES) | A | Z |
| 0 0 0 0 0 0 1 0 | PATTERN 2 (20 MELODIES) | B | Z |
| 0 0 0 0 0 0 1 1 | PATTERN 3 (30 MELODIES) | C | Z |
| ⋮ | ⋮ | ⋮ | ⋮ |
| 1 1 1 1 1 1 1 1 | PATTERN n (n MELODIES) | N | Z | n: MAX. (e. g., 1000 MELODIES)

FIG. 5

| CODE (4 BITS) | ATTRIBUTE INFORMATION ||
| --- | --- | --- |
| | USING METHOD/SERVING METHOD | BONUS CONTENT |
| 0 0 0 0 | NOT PROVIDED | NOT PROVIDED |
| 0 0 0 1 | MELODY SPECIFIED BY SERVER'S SIDE | |
| 0 0 1 0 | GROUPED SERVICE-TARGET MELODIES    GPa | |
| 0 0 1 1 | GROUPED SERVICE-TARGET MELODIES    GPb | |
| 0 1 0 0 | GROUPED SERVICE-TARGET MELODIES    GPc | |
| 1 0 0 0 | NOT PROVIDED | PROVIDED |
| 1 0 0 1 | MELODY SPECIFIED BY SERVER'S SIDE | |
| 1 0 1 0 | GROUPED SERVICE-TARGET MELODIES    GPa | |
| 1 0 1 1 | GROUPED SERVICE-TARGET MELODIES    GPb | |
| 1 1 0 0 | GROUPED SERVICE-TARGET MELODIES    GPc | |

FIG. 6

| CODE (2 BITS) | CLASSIFICATION OF DISC |
| --- | --- |
| 0 0 | ROM |
| 0 1 | R |
| 1 0 | RW |
| 1 1 | reserved |

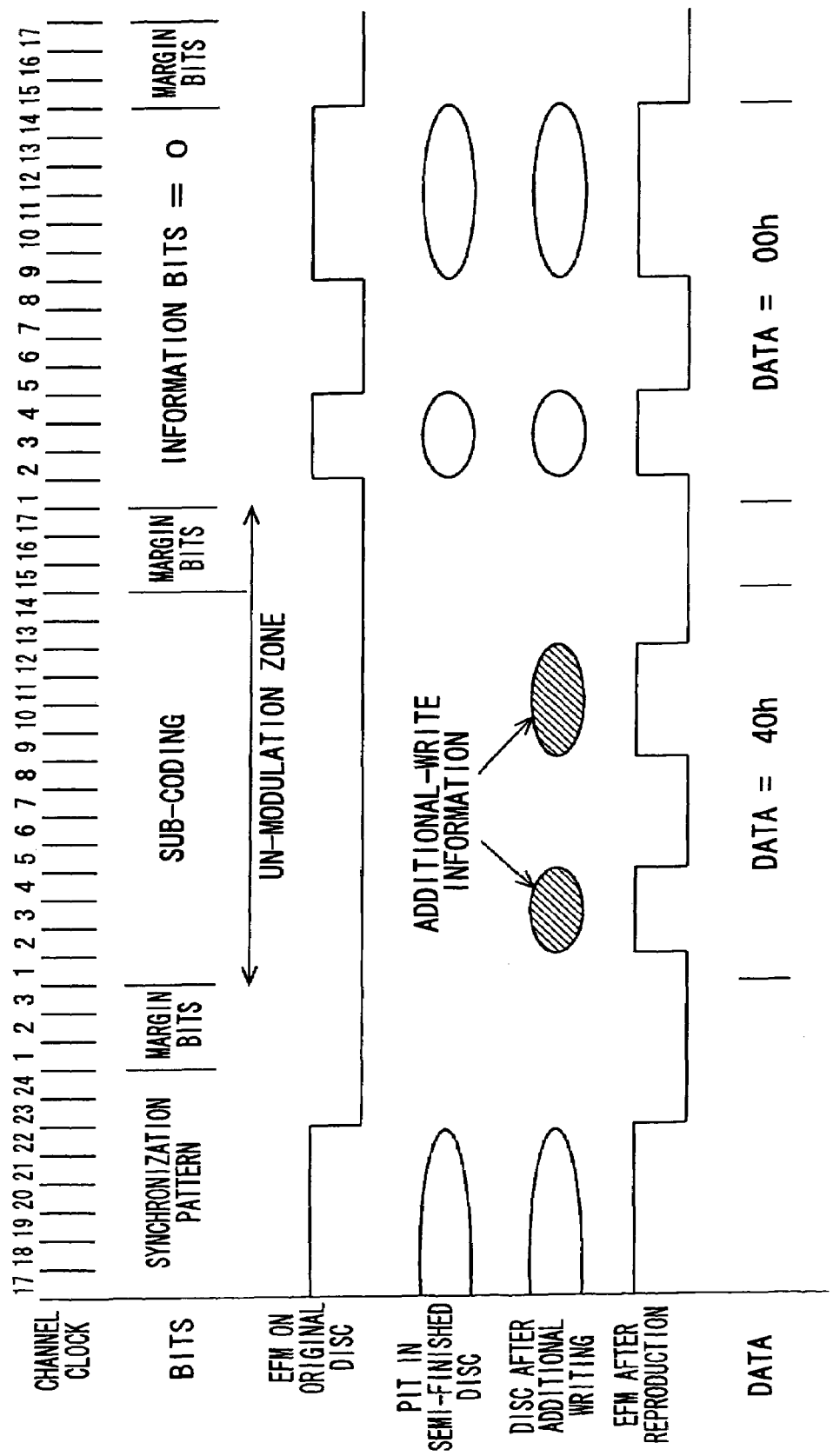

RECORDING MEDIUM, RECORDING METHOD, INFORMATION TRANSMISSION METHOD, TERMINAL DEVICE, AND SERVER DEVICE

TECHNICAL FIELD

The present invention relates to a recording medium, a recording method, an information transmission method, a terminal device, and a server device.

BACKGROUND ART a recorded or recordable recording medium such as a compact disc (CD) or a digital versatile disc (DVD) has been considered to record identification information (ID) peculiar to a recording medium. This identification information can be used as an identifier for deciding whether this recording medium is an authentic one or an illegally copied one.

However, if any other information can be added to the medium identification information, the added information (hereinafter referred to as "relevant information") can be used to realize a variety of services peculiar to the recording medium. That is, medium information comprising the relevant information in addition to the medium identification information can be used also as an identifier for enjoying the various services.

The various services, if information recorded on a recording medium has been encrypted, for example, refer to capability of accessing a managing server which manages medium information to thereby acquire from the managing server key information required for decryption of the information. This is because, also in a case where information is to be recorded on a recording medium as encrypted, if key information (decryption key etc.) for decryption of the information is recorded on the same recording medium, the encrypted information can be decrypted using the key information when the recording medium is illegally copied. Storing key information of encrypted information separately from the recording medium allows such illegal utilization thereof to be eliminated.

Alternatively, information indicating a classification of a recording medium may be added as relevant information, so that, if a classification of a medium onto which information is copied from this recording medium is different from a classification of this original medium, this copied medium can be decided to be an illegally copied one, thus contributing to protection of copyright.

If this relevant information is available, it is possible to further acquire information (contents) related to information recorded or to be recorded, that is, music information, information about artists etc. related to music information, image information (still images, moving images), or digital information such as program data which is used in a computer.

PROBLEMS THAT THE INVENTION SHOULD SOLVE

If this medium information is ranked at one function of an identifier required to enjoy a variety of services, it is possible to access, for example, a particular service institution by using a terminal device capable of reproducing this recording medium and further use this medium information as authentication information, thereby constituting such an information service system as to enjoy a particular service.

However, medium information to be recorded on a recording medium has been ranked at an identifier for identifying the medium itself, so that it has been impossible to realize various services. For example, in an exemplified case where information is recorded as a plurality of irregular pits beforehand on a recording medium (CD-ROM disc, DVD-ROM disc, etc.) and many melodies, for example, 1000 melodies are included on this recording medium, if 10 melodies of these included melodies are on sale, information (title information) indicating those 10 melodies as a reproducible range is added to medium information beforehand. If 100 melodies can be reproduced, information indicating these 100 of the 1000 melodies as a reproducible range is added to the medium information beforehand.

In such a manner, even if the same numbers of melodies with the same melody titles recorded on a recording medium are included, by making different only the medium information recorded on the medium from each other, it is possible to set prices corresponding to the number of reproducible melodies and provide only a user-requested number of melodies. If information recorded on the recording medium is encrypted beforehand (cipher-text), key information required to decrypt (decode) the encrypted information can be stored beforehand at a managing server which manages the recording medium so that the managing server may provide this key information only to a user authenticated to be a legal purchaser, thus protecting copyright of the information recorded on the recording medium because illegal third parties cannot decrypt the encrypted information.

Alternatively, in a case where information to be recorded is selected from information (contents) stored at the above-mentioned managing server if a write-once recording medium such as a CD-R (CD-Recordable) disc or a rewritable recording medium such as a CD-RW (CD rewritable) disc is used to write the information, prices corresponding to an amount of information to be downloaded can be set. If inserting, into the medium information beforehand as attribute information of the recording medium, information about which one of a plurality of service-target groups can be selected in which melody titles to be downloaded and the number of melodies are respectively divided as groups and included, a user can download information belonging to the selected service-target group by transmitting medium information recorded on the recording medium beforehand to the managing server at an arbitrary timing.

By thus utilizing, besides medium identification information for identifying a recording medium itself, medium information including various pieces of relevant information related to this recording medium, it is possible to provide not one-dimensional but various services suitable for the user's tastes.

DISCLOSURE OF THE INVENTION

To solve these conventional problems, the present invention has been developed, by which besides medium identification information for identifying a recording medium itself especially, medium information including various pieces of relevant information related to this medium can be recorded to thereby realize diversified services.

To solve these problems, a recording medium related to the present invention described in claim 1 comprises a lead-in region, a recording region in which information is recorded, and a lead-out region, wherein medium information including medium identification information and relevant information is recorded in at least any one of the lead-in region, the recording region, and the lead-out region.

An information transmission method related to the present invention described in claim 11 comprises the steps of transmitting, from a terminal device to a server device, medium information read out of a recording medium comprising a lead-in region, a recording region in which information is recorded, and a lead-out region, wherein the medium information including medium identification information and relevant information is recorded in at least any one of the lead-in region, the recording region, and the lead-out region; causing the server device to verify the transmitted medium information for authenticating it, and transmitting to the terminal device information specified on the basis of the relevant information included in the medium information when the transmitted medium information is authenticated properly.

A terminal device related to the present invention described in claim 19 comprises a head portion for reading out information recorded on a recording medium comprising a lead-in region, a recording region in which information is recorded, and a lead-out region, wherein medium information including medium identification information and relevant information are recorded in at least any one of the lead-in region, the recording region, and the lead-out region; a decode processing portion for performing decode processing on an output signal provided from this head portion; an extraction portion for extracting the medium information from an output signal provided from this decode processing portion; a transmission-and-reception portion for transmitting the medium information extracted by this extraction portion and receiving information transmitted from an outside; and a control portion for performing an operation control based on the information read out of the lead-in region of the recording medium by the head portion and the information received by the transmission-and-reception portion.

A server device related to the present invention described in claim 18 comprises a transmission-and-reception portion for receiving and transmitting medium information transmitted after being read out of a recording medium, the recording medium comprising a lead-in region, a recording region in which information is recorded, and a lead-out region, wherein the medium information including medium identification information and relevant information is recorded in at least any one of the lead-in region, the recording region, and the lead-out region; a management information storage portion in which management information including the medium information is stored; a storage portion in which information specified by the relevant information is stored; and a control portion for authenticating the medium information received by the reception portion based on the medium information thus received and the medium information stored in the management information storage portion, for allowing information specified on the basis of the relevant information included in the medium information to be read out of the storage portion, when the received medium information is properly authenticated, and then causing the transmission-and-reception portion to transmit the specified information.

A recording method related to the present invention described in claim 11 comprises the steps of recording medium information including medium identification information and relevant information in at least any one of a lead-in region, a recording region, and a lead-out region of a recording medium, the recording medium comprising a disc substrate in whose one surface a plurality of irregular patterns based on information is formed, a reflection film formed on the one surface of the disc substrate, and a protection film for protecting this reflection film as well as the lead-in region, the recording region in which the above-mentioned information is recorded, and the lead-out region.

A recording medium related to the present invention, irrespective of whether it is a recorded one or a recordable one, is adapted to record not only medium identification information but also medium information including relevant information related to the recording medium in a predetermined area. Recording this relevant information allows various service forms to be realized. For example, it is possible to customize a recording medium by sorting out only user-preferred information of the pieces of information recorded on the recording medium, to realize a recording medium which has a high security level and is difficult to copy illegally by acquiring key information from the managing server, and to provide a recording medium having benefits.

By a recording method related to the present invention, medium information is recorded in an area of the recording medium of which data can be read out but to which no data can be re-recorded (rewritten). According to this method, medium information once recorded cannot be rewritten nor copied, thus featuring prevention of the medium information from being tampered.

A terminal device related to the present invention extracts and separates plural pieces of medium information from reproduced information on the basis of TOC information and saves it so that it can be read at a necessary timing and used.

It has a feature that medium information can be easily extracted and separated by utilizing the TOC information. When this medium information is utilized as information required to receive services accumulated at the managing server, conveniently service forms can be managed only by the medium information.

An information transmission method related to the present invention enables giving and receiving of information by use of medium information by linking a terminal device having the medium information and a managing server to each other via a communication line network.

It has a feature that user-desired services or customized different services can be smoothly realized using the medium information. In this case, the medium information is recorded on a recording medium beforehand and managed by a managing server, so that the services can be managed independently of the terminal device, which also reproduces the recording medium. In such a manner, the present invention features that management of customized services can be realized only by plural pieces of medium information recorded on the recording medium.

Further, a server device related to the present invention authenticates received medium information based on the received medium information and medium information stored in the management data portion. If the received medium information is authenticated properly, it reads out specified information from the information storage portion based on relevant information included in the medium information and then it transmits the specified information from the transmission-and-reception portion.

It is thus adapted to provide the specified information, if a recording medium is authenticated properly, based on medium information recorded on the recording medium, thus giving a practical merit that particular information can be provided only to a person having a legitimate recording medium.

BRIEF DESCRIPTION OF THE DRAWINGS

FIG. 3 is a configuration diagram for showing medium information which is recorded on a recording medium related to the present invention;

FIG. 4 is an explanatory diagram of title information reproducible as relevant information among medium information with reference to key information;

FIG. 5 is a diagram for showing a relationship between bonus content information and attribute information as relevant information among medium information;

FIG. 6 is a diagram for showing a relationship between a recording medium classification and code information;

FIG. 15 is an explanatory illustration of the operations.

BEST MODE FOR CARRYING OUT THE INVENTION

The following will describe in detail one embodiment of a recording medium etc. related to the present invention with reference to drawings.

Figure 1:
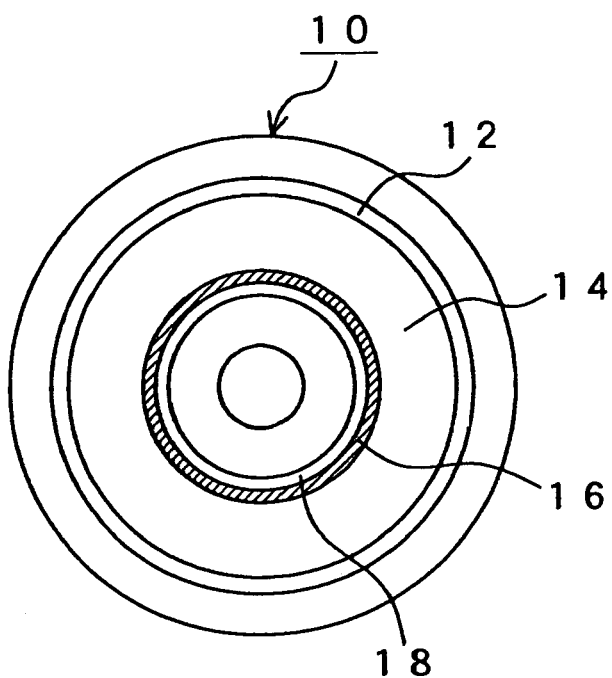
FIG. 1 is a conceptual diagram for showing an embodiment of a writable recording medium related to the present invention.

FIG. 1 shows an embodiment of a disc-shaped recording medium 10, which is a writable recording medium related to the present invention. This recording medium 10 has a data recording region 14 and auxiliary recording regions 16 and 18. The data recording region 14 is a region in which a terminal device (not shown) can write data and the auxiliary recording regions 16 and 18 are regions in which the terminal device cannot write data.

In the innermost-periphery region 18 of the auxiliary recording regions 16 and 18, medium information or the like is recorded and in the data recording region 14, original data (particular contents-data) is recorded.

This writable recording medium may typically be a write-once CD-R disc or a rewritable CD-RW disc if it is a compact disc CD. If the medium is a digital versatile disc DVD, it may typically be a write-once DVD-R disc or a rewritable DVDRW disc, etc. similarly.

As well known, the optical disc 10 has a basic construction such that a lead-out region 12 is positioned at an outermost periphery and, on its inner side, a program area (PA) 14, which is a contents-data recording area, is positioned. This program area 14 corresponds to the data recording region. On an inner-periphery side of the program area 14, a lead-in area 16 for recording TOC information is positioned, and then, on an inner-periphery side thereof, a program memory area (PM) 18 is provided. The lead-in area 16 and the program memory area 18 correspond to the auxiliary recording region.

As well known, in the program memory area 18, temporary TOC information is recorded before complete processing or finalization processing is performed. As far as temporary TOC information is recorded in the program memory area 18, data such as contents-data can be written further in the program area 14 after the data record has been once finished. However, if an operation which should perform complete processing is performed, TOC information is written in the lead-in area 16, so that subsequently write (record) processing is impossible any more.

Figure 2:
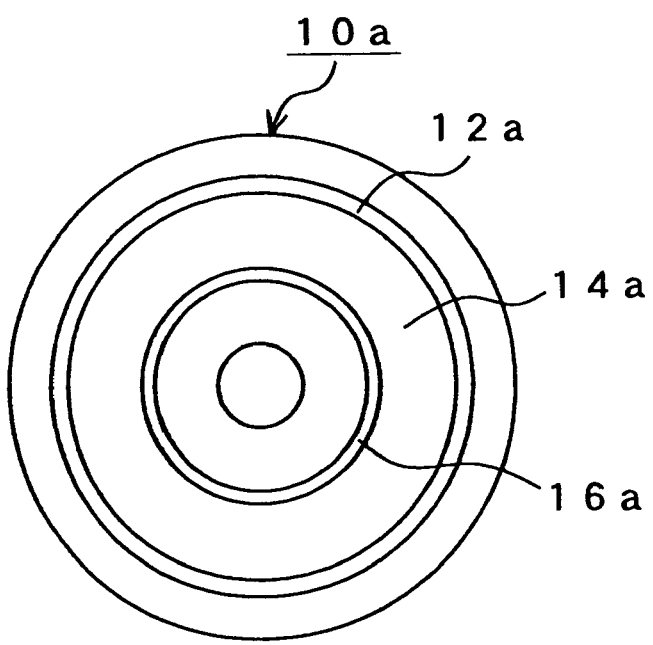
FIG. 2 is a conceptual diagram for showing an embodiment of a recorded recording medium related to the present invention.

FIG. 2 shows an optical disc serving as a recording medium in which data is recorded beforehand by a plurality of irregular patterns, so-called pits. This optical disc 10a comprises a program area 14a serving as a data recording region in which data is recorded, a lead-out area 12a placed on its outer-periphery side, and a lead-in area 16a placed on its inner-periphery side. This recorded recording medium may typically be a CD-ROM disc, a DVDROM disc, etc.

On these recording media 10 and 10a shown in FIGS. 1 and 2, medium information UID is recorded. The medium information UID is used for authentication of a medium when a particular server device (hereinafter referred to as "managing server") is accessed or for acquiring information (contents-data for a service etc.) accumulated at the managing server after authentication. It is also utilized as a kind of service to be provided to a person who has purchased the recording media 10 or 10a legitimately.

According to the present invention, irrespective of whether a recording medium is a recorded medium or a recordable medium that is unrecorded, medium information (UID) peculiar to this medium is recorded. The medium information UID contains relevant information related to the medium in addition to medium identification information peculiar to the medium.

FIG. 3 shows its specific example. In a configuration of medium information UID, a serial number functioning as medium identification information is positioned at a top. The medium identification information is peculiar to a relevant recording medium and a serial number having a predetermined number of digits is utilized as it. This medium identification information is used to identify the recording medium itself.

Next to the serial number, relevant information is positioned. The relevant information contains, as shown in the figure, reproducible title information, attribute information of the medium, and a classification of the medium. At the end of the medium information UID, a code for error correction, for example, an error correction code (ECC) is added. The above information of the medium information UID may be positioned in random order. A configuration of the relevant information could have been different to some extent depending on whether the relevant recording medium is a recorded recording medium or a recordable recording medium.

In the case of a recorded recording medium, the relevant information of medium information UID is effective if recorded data is music data and the music data has been encrypted. By assuming such a case, the number of reproducible melodies corresponding to a purchase price is set beforehand and deposited as reproducible title information in the relevant information.

FIG. 4 shows a specific example of the reproducible title information. In illustrated example, code information corresponds to reproducible title information, that is, the number of reproducible melodies. For example, if eight bits are used to represent reproducible title information, the number of reproducible melodies can be given in 256 combinations. The number of reproducible melodies is, in other words, the number of prepaid melodies, so that one piece of code information corresponding to a purchase price of a recording medium is recorded on a recording medium. For example, if 10 melodies are purchased, code information "00000001" is recorded in a reproducible title information field and if 30 melodies are purchased, code information "00000011" is recorded on the recording medium.

It is to be noted that as shown in FIG. 4, the eight bits being all "0" indicates that the number of prepaid melodies is zero. Therefore, the recording medium, if all-zero is recorded in it, may be decided to be an unrecorded recording medium at any rate.

In a case where recorded music data, that is, recorded information is encrypted, the managing server (Web site, which will be described later) for managing medium information is supplied with key information required to decrypt the encrypted information. This key information is also shown in FIG. 4. The key information is either a decryption key for decrypting encrypted information or key information for generating this decryption key. Encryption utilized here may be a common key system or a public key system.

As shown in FIG. 4, ordinarily the same key information Z is provided as key information to a user even with the different numbers of reproducible melodies. However, different pieces of key information A, B, C, . . . , and N for the different numbers of reproducible melodies may sometimes be provided to users. Whether a relevant recording medium is to be provided with the key information can be decided by referencing a classification of the recording medium, to be described later.

FIG. 5 shows one example of attribute information contained in the relevant information. The attribute information indicates a servicing method or a using method related to information recorded or to be recorded on a recording medium and is represented by a code.

For example, in a case where a write-once or rewritable recording medium associated beforehand so that information such as music data accumulated at the above-mentioned managing server may be downloaded on it is purchased, information that can be downloaded is recorded beforehand as attribute information. Therefore, a user would decide beforehand which information is to be downloaded when he/she purchases the recording medium. FIG. 5 shows one example of downloading as service information music data among pieces of information accumulated at the managing server, which information is classified by a four-bit code as follows in the present embodiment:

(a) Low-order three bits "000": No attribute information provided;
(b) Low-order three bits "001": Melodies specified by the managing server are downloaded;
(c) Low-order three bits "010": Service-target melodies GPa that have been grouped are downloaded;
(d) Low-order three bits "011": Service-target melodies GPb that have been grouped are downloaded; and
(e) Low-order three bits "100": Service-target melodies GPc that have been grouped are downloaded.

It is to be noted that no attribute information may be inserted in some cases. This holds true with a recording medium in which information is recorded beforehand by a plurality of pits. The number of target melodies GP depends on a price of the medium and a melody title is specified beforehand on the side of the managing server. Therefore, the service-target melodies GPa, GPb, and GPc are selected to be the same as each other in terms of the number of melodies that can be downloaded but different in terms of melody title.

The user specifies which attribute information is to be selected when he/she purchases the medium and finds that only code information indicating the specified attribute information is inserted and recorded in the medium he/she has purchased.

In the embodiment shown in FIG. 5, the attribute information further contains information that indicates whether service contents can be enjoyed. If the most significant bit (MSB) of the code information is "0", the user is not qualified to enjoy service contents and if the MSB is "1", he is qualified to enjoy them.

The service contents refer to, for example, a benefit (special data) to be given when the user has purchased a recording medium having a purchase price higher than a prescribed price and they are prepared by the managing server. Contents-data for the service may be considered as music data, still image data of an artist, etc.

In the case of the above-mentioned embodiment, is recorded the medium information so that information (contents-data) to be downloaded can be determined when a recording medium is purchased. In contrast to it, however, after the recording medium is purchased, such attribute information may be inserted that the user is permitted to arbitrarily select and determine information to be downloaded. In this case, the user can arbitrarily determine information (which refers to aspects of many contents prepared, specifically, the number of melodies or the melody titles if the contents are music data) to be downloaded by accessing the managing server.

It is considered that other attribute information may include, for example, key information used to decrypt information recorded on a recording medium. This is because, if information to be downloaded from the managing server is itself encrypted beforehand, it is necessary to download key information for decryption from the managing server simultaneously with downloading of the information or thereafter.

FIG. 6 shows information indicating classifications of recording media as relevant information. As information indicating classifications, a recording medium in which information is recorded by a plurality of pits beforehand, that is, a reproduction-only recording medium is given a two-bit code "00" indicating "ROM", a write-once recording medium is given a code "01" indicating "R", and are rewritable recording medium is given a code "10" indicating "RW". The others are given a two-bit code "11" indicating "reserved".

The managing server can recognize this attribute information to thereby decide any classification of a recording medium that is accessed. Therefore, if the managing server is accessed from a recording medium to which information read from a recorded recording medium (ROM) is copied, for example, a write-once recording medium such as CD-R disc, identification information (ID) peculiar to the write-once recording medium as well as the above-mentioned medium information are transmitted at the same time to the managing server. The managing server in turn can refer attribute information included in the transmitted medium information, that is, information indicating a classification of the recording medium to thereby decide that the access-source recording medium has illegally copied information at a high probability. In this case, if the managing server transmits a warning message to a reproduction device serving as a terminal device to stop provision or transmission of services prepared by the managing server, for example, protection of copyright of information recorded on the recording medium can be secured further.

In a case where a recording medium is purchased actually, if the recording medium is a recorded recording medium in which information has already been recorded, information indicated by hatching in FIGS. 4-6, for example, is recorded as medium information beforehand. If the recording medium is a recordable recording medium, information indicated by dots in FIG. 4-6, for example, is recorded as the medium information beforehand.

The above-mentioned medium information is just one example, so that arbitrary numbers and contents of items may be contained in the medium information along with types of contents-data as information accumulated at the managing server.

When a recorded recording medium wherein the medium information is recorded in an arbitrary area from which data can be reproduced but to which no data can be rewritten is purchased, in a process after original data is recorded, at least one piece of medium information is additionally recorded using, for example, high-power laser light into at least one of a recorded area (program area) in which data has been recorded, a lead-in region, and a lead-out region. In the case of a recordable recording medium, at least one piece of medium information is recorded using laser light etc. into a program memory area (PMA) provided on the inner-periphery side of the lead-in region.

If medium information UID is recorded in any area other than the program memory area, information indicating an address in which it is recorded, that is, address information is recorded in the lead-in region as one piece of table of contents (TOC) information.

When the recording medium is reproduced, multiple pieces of medium information UID is read with referencing the TOC information in principle. The medium information UID thus read is saved and, when necessary, accessed via a communication line network (the Internet etc.) at a managing server (Web site) for managing medium information as a service institution.

When the read medium information UID has been transmitted, the managing server records it on a recording medium and can know contents of the transmitted medium information UID, to decide which information should be transmitted to a user.

The managing server has a medium information managing database, in which password information, which is user information, is managed beforehand and management information (medium information) is saved for each recording medium accessed.

Figure 7:
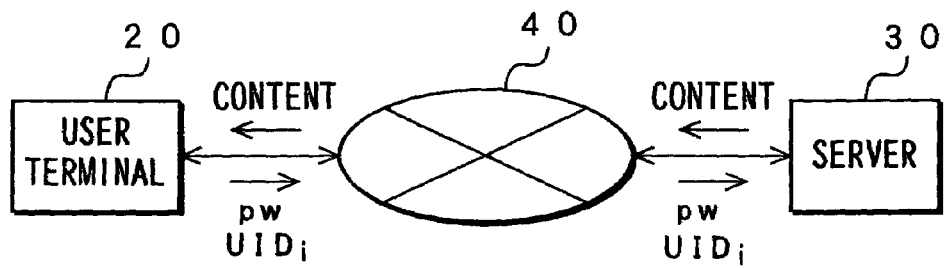
FIG. 7 is a conceptual diagram for showing an embodiment of an information service system to which the present invention can be applied.

It is to be noted that an information service system to which the present invention can be applied is, as shown in FIG. 7, constituted by connecting a terminal device 20 for receiving services and a medium information managing server (server device) 30 in which contents-data as information is accumulated to each other via a communication line network 40 such as the Internet. Such services are provided that when the terminal device 20 transmits medium information UID read from the above-mentioned recording medium to the managing server 30 and this transmitted medium information UID is authenticated properly, the medium information UID is analyzed to transmit to the terminal device 20 the information accumulated at the managing server 30.

The terminal device 20 is provided with a reproduction unit (which may be a recording/reproduction unit) for reproducing an optical disc serving as a recording medium and a transmission/reception unit for transmitting/receiving data and thus, it can read and reproduce data recorded in a program area of the optical disc 10 or 10a serving as a recording medium and read medium information UID recorded in the optical disc 10 or 10a to receive a particular service by using the read medium information UID. Therefore, the following will describe the present invention by using as an example the optical disc 10a of the optical discs 10 and 10a, which is a recorded recording medium in which information is recorded beforehand by a plurality of pits as in the case of a CD-ROM disc.

Figure 8:
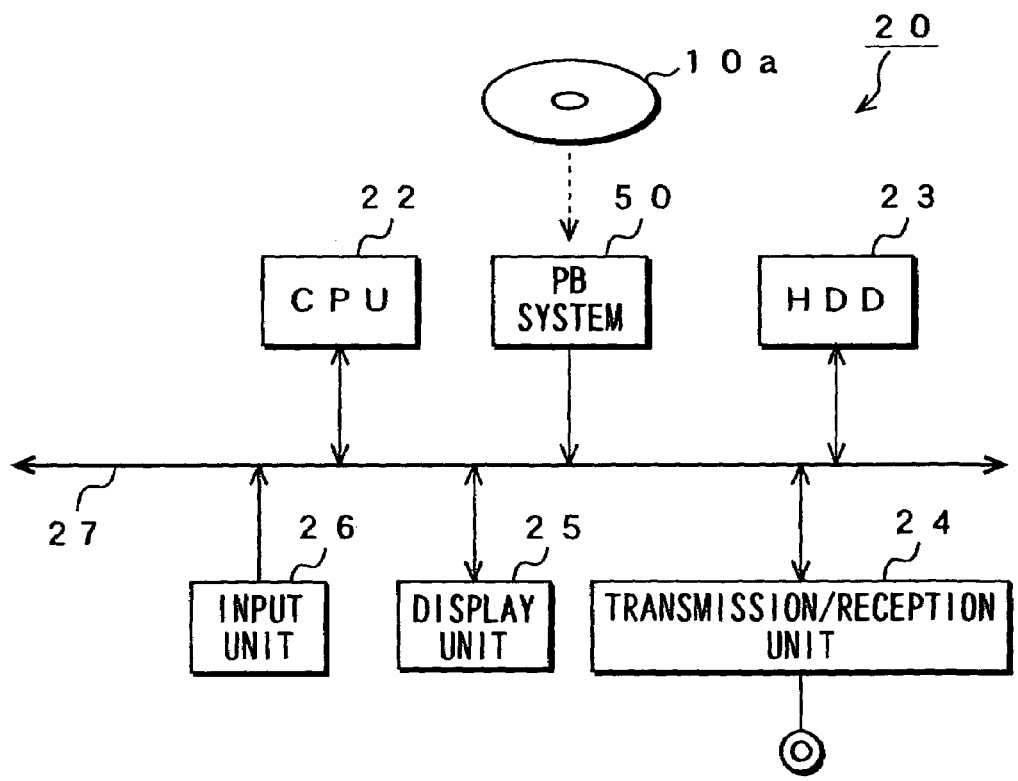
FIG. 8 is a system diagram of a substantial part for showing an embodiment of a terminal device related to the present invention.

FIG. 8 shows a configuration of this terminal device 20, which has a reproduction device 50 for reproducing the optical disc 10a as described above. This terminal device 20 comprises a control unit 22 constituted of a CPU for controlling the device as a whole, a storage unit 23 constituted of, for example, a hard disc drive for recording and saving various kinds of data, and a data transmission/reception unit 24 serving as a communication interface for giving data to and receiving it from an outside, which units are connected to a bus 27. Furthermore, a display unit 25 such as an LCD and an input unit 26 constituted of a keyboard for inputting operation information are connected to each other via the bus 27.

By providing such a configuration, the terminal device 20 performs reproduction processing of data including medium information from the optical disc 10a, data giving and reception processing for transmitting medium information UID read out of the optical disc 10a to the managing server 30 and receiving data including information transmitted from the managing server 30, and storage processing for writing received data into the storage unit. The control unit 22 has a built-in memory (not shown) such as a ROM in which processing programs required to perform these processing items are stored.

Figure 9:
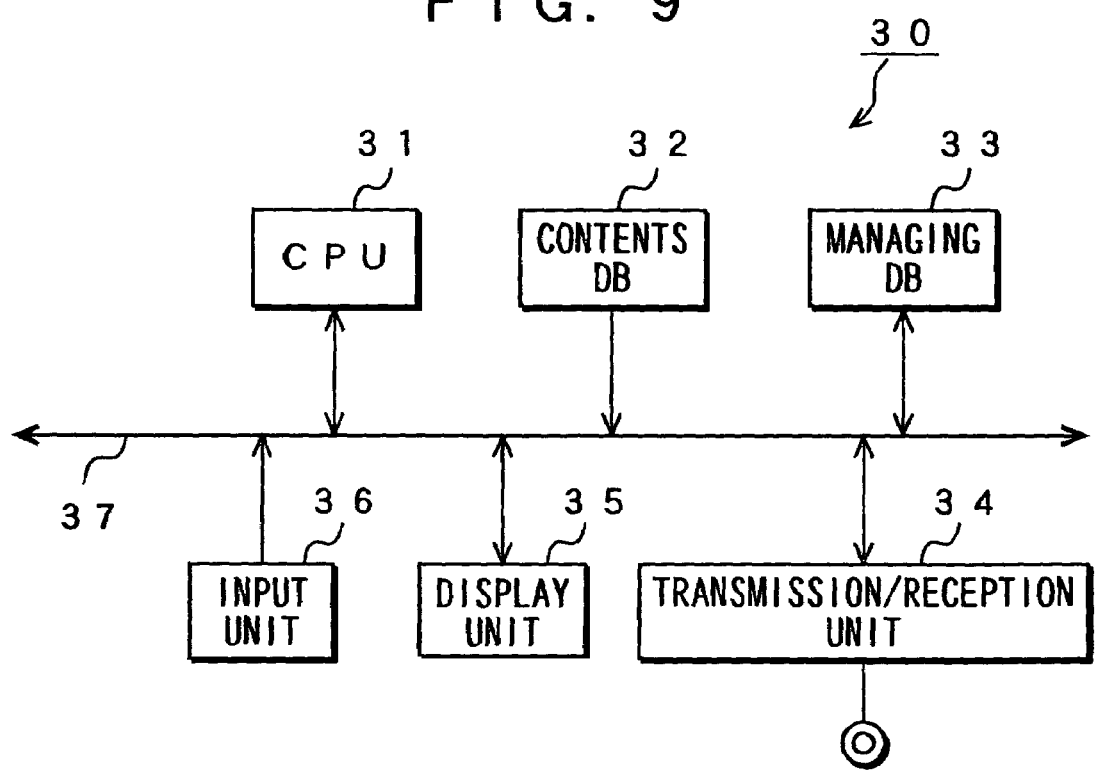
FIG. 9 is a system diagram for showing an embodiment of a managing server, which is a server device related to the present invention.

FIG. 9 shows a configuration on the side of the managing server 30, which is a server device. The configuration is such that the managing server 30 authenticates medium information UID transmitted from a user, that is, the terminal device 20 and, if the transmitted medium information UID is authenticated properly, a specified service is provided to the terminal device 20 and thus, it performs processing for medium management and the like.

For this purpose, as shown in FIG. 9, this managing server 30 comprises a control unit 31 having a CPU for controlling the device as a whole, a database unit 32 in which multiple items of contents-data, in this case, grouped items of data as shown in FIG. 5 and items of contents-data for service are accumulated, and a managing database unit (management information storage unit) 33 in which a variety of kinds of management information such as medium information UID peculiar to the optical disc 10a and key information is accumulated. Besides these, it comprises a transmission/reception unit 34 serving as a communication interface for giving and receiving data with an outside, that is, a terminal device 20, a display unit 35 constituted of an LCD for displaying information such as medium information UID, an input unit 36 such as a keyboard or a mouse used for inputting of information, etc. The control unit 31 has a built-in memory (not shown) such as a ROM in which processing programs required to perform these processing items are stored. The control unit 31, the database unit 32, the managing database unit 33, the transmission/reception unit 34, the display unit 35, and the input unit are connected to each other via a bus 37.

Figure 10:
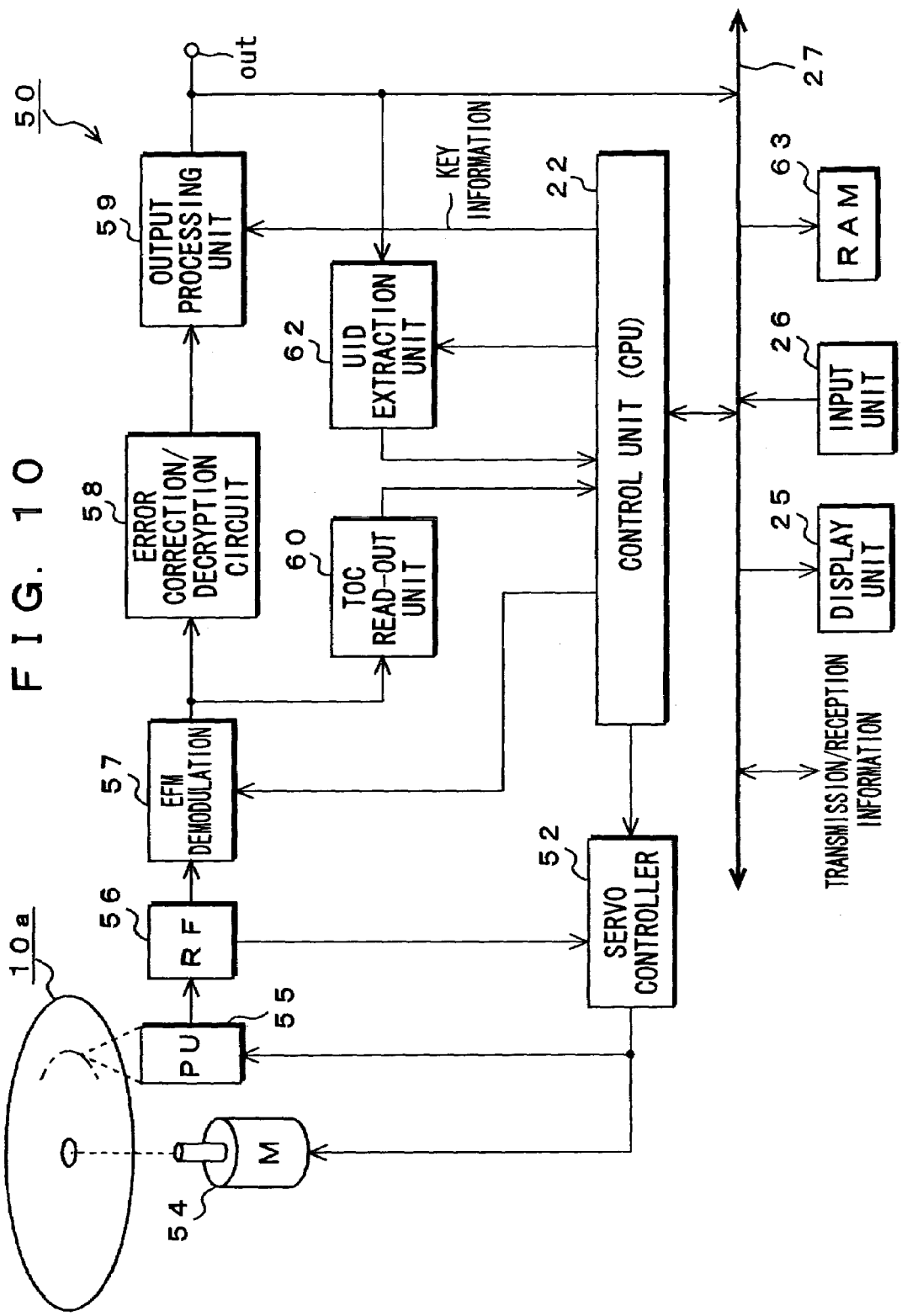
FIG. 10 is a system diagram of a substantial part for showing another embodiment of a reproduction device to which the present invention can be applied.

FIG. 10 is a block diagram for showing a configuration of the reproduction device 50 to which the present invention can be applied.

Controlling a servo controller 52 using a control signal from the control unit 22 allows a spindle motor 54 to rotate to rotary-drive the optical disc 10a so that its linear velocity may be constant, whereupon information recorded on the optical disc 10a is read by an optical pickup unit 55. Reflected light from the optical disc 10a is converted into an electric signal by a photo-detector of the optical pickup unit 55.

An output signal from the optical pickup unit 55 is supplied via an RF amplifier 56 to a demodulator 57 where it performs demodulation processing, that is, Eight-to-Fourteen Modulation (EFM) demodulation processing. Of the output signals provided by the demodulator 57, an output signal corresponding to information read out of the program area 14 is further supplied to a downstream-side error correction/decryption circuit 58 where it performs error correction processing and decryption processing. An output signal from the error correction/decryption circuit 58 is output via an output processing unit 59 from an output terminal as reproduction output information and then, an output signal from the output processing unit 59 is also supplied to a medium information extraction unit 62 where medium information UID recorded on the optical disc 10a is extracted and separated.

On the other hand, the output signal which has performed EFM demodulation at the demodulator 57 is also supplied to a read-out unit 60 for extracting TOC information, where the TOC information is extracted and separated from it. The extracted and separated TOC information is supplied to the control unit 22 where address information of the medium information is extracted from the TOC information. This address information is utilized to extract and separate only the medium information UID from the output signal of the output processing unit 59 that is supplied to the extraction unit 62, and then the medium information UID is saved in a memory (RAM) 63 temporarily.

In response to input information from the input unit 26, the medium information UID is read out of the memory 63 and then, the read medium information UID is transmitted to the managing server 30 via the transmission/reception unit 24 (see FIG. 8) serving as a transmission/reception interface.

The output processing unit 59 is supposed to have a decryption processing function, which is not shown. If information recorded on the optical disc 10a has been encrypted, decryption processing is performed for decrypting cipher using key information provided from the managing server 30. The key information, which is either a decryption key itself or, in some cases, information for creating legitimate decryption key using this key information, is configured so as to match security of the information service system and provided from the managing server 30.

It is to be noted that information (image data etc.) recorded in the program area of the optical disc 10a is supplied from the output processing unit 59 via the bus 27 to the display unit 25 where images etc. are reproduced and, as necessary, they are output to an outside of the terminal device 20. If the information recorded on the optical disc 10a is music information, the output signal from the output processing unit 59 is supplied to a voice reproduction circuit to be reproduced as audible sound such as voice, which is not shown.

Figure 11:
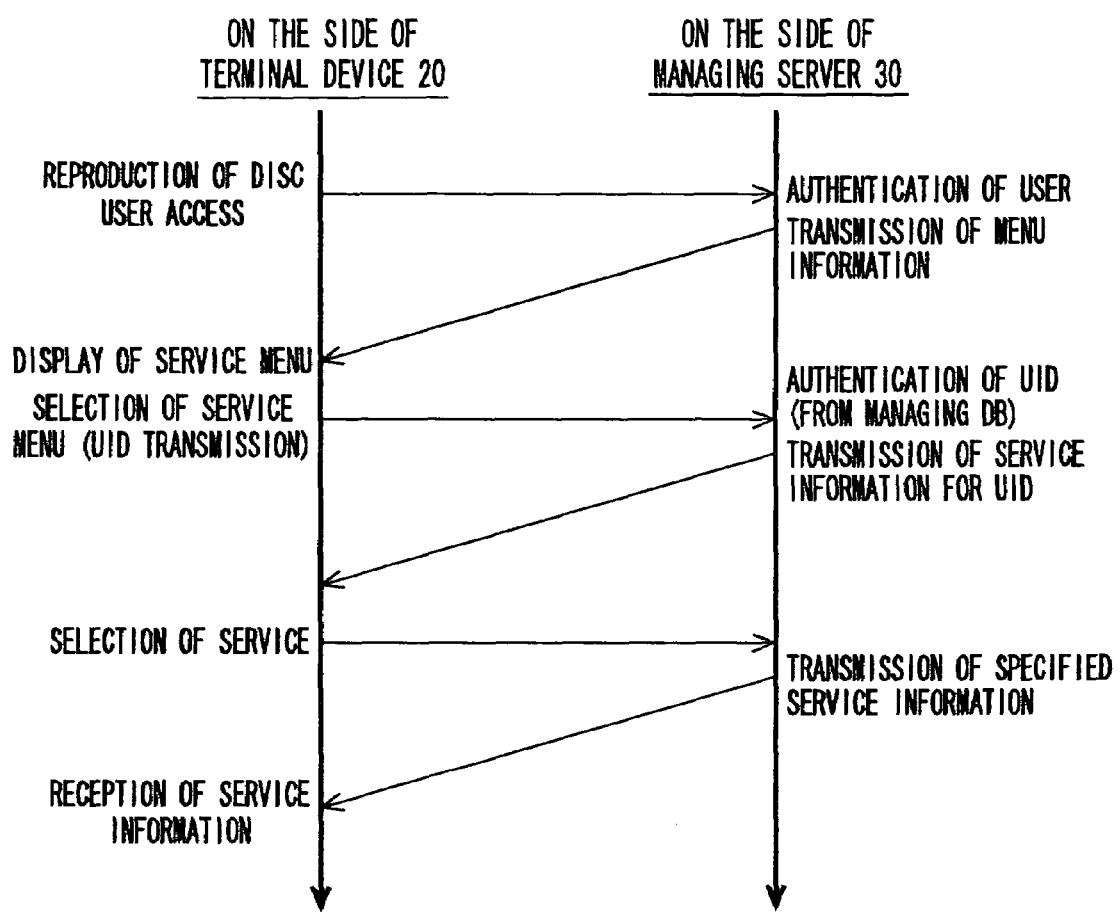
FIG. 11 is a flowchart for showing an example of data processing between a terminal device and a management server, which is a server device.

The following will describe various processing examples in a case where an information service system such as shown in FIG. 7 is constituted, with reference to FIG. 11 and the following. FIG. 11 is an explanatory outline (flowchart) of one example of an information transmission method, which is overall processing of this information service system and by which the terminal device 20 related to medium information reproduces the optical disc 10a to acquire medium information UID. This medium information UID is saved in the memory 63. The medium information UID can be displayed at the display unit 25 simultaneously or made unknown, taking account of safety.

Next, the user performs processing for accessing the managing server 30 via the communication line network 40. In this case, since the user must be authenticated, the user's side transmits data about a password PW, which has been set up between him/her and the managing server 30 beforehand. Based on the data about the transmitted password, the managing server 30 authenticates the user and, if he/she is authenticated properly, it transmits to the user's terminal device 20 menu information to be handled on the side of the managing server. The terminal device 20 displays the service menu based on the transmitted menu information. If the user selects a submenu using the medium information UID based on the displayed menu information, information of the submenu thus selected is transmitted from the terminal device 20 to the managing server 30.

At the managing server 30, the already transmitted medium information UID is analyzed and processing that matches the analyzed contents is performed. As the prerequisites, the managing server 30 authenticates the medium information UID on whether it is legitimate medium information utilizing medium classification information and management information for each medium accumulated in the managing database unit 33. This is done in order to exclude access etc. from an illegally copied recording medium. As the management information for each medium accumulated in the database unit 33, management information (which is the same information as the medium information) peculiar to a medium provided from a disc manufacturer or a disc trader is utilized.

If the medium information UID transmitted to the managing server 30 has no information peculiar to the medium such as a serial number, by checking whether the transmitted medium information has a legitimate data structure, it is possible to decide whether the transmitted medium information is authentic, illegally acquired, or created by illegal copy.

If the transmitted medium information is decided to be authentic, it is registered in the managing server 30 together with the user s password. The medium information UID has been described in accordance with a predetermined format as shown, for example, in FIG. 3, so that by verifying whether this is regular UID, it is possible to decide whether the transmitted medium information UID has been copied illegally.

Subsequently, information in response to the medium information decided to be authentic is transmitted to the terminal device 20 on the side of the user. In this case, as the information in response to the medium information to be transmitted from the managing server 30, key information is transmitted if the medium information is reproducible title information. If the medium information is a service-target melody GP specified as attribute information, that service-target melody is transmitted as referencing the contents database unit 32. If the user is qualified to enjoy a service content, which is special data, as a bonus as a result of decision of the transmitted medium information UID, contents-data for service is also read out of the database unit 32 and transmitted to the terminal device 20 on the side of the user.

If the information transmitted from the managing server 30 is key information, the terminal device 20 saves this key information in the memory 63 and utilizes this key information to decrypt cipher applied to information read out of the optical disc 10a. If the information recorded on the optical disc 10a is music data, this key information is used to decrypt cipher applied to the music data, which undergoes demodulation error correction processing to be reproduced.

If the optical disc 10a as a recording medium mounted to the terminal device 20 is a rewritable recording medium such as a CD-R disc, the information to be transmitted from the managing server 30 is information to be recorded on the recording medium, so that in this case, an information recording/reproducing device (not shown) is introduced in place of the reproduction device 50 shown in FIG. 10 and utilized to record the information transmitted from the managing server 30, that is, downloaded information on the recording medium. If the downloaded information has been encrypted taking account of security, the terminal device 20 simultaneously acquires key information required to decrypt this information.

It is to be noted that the managing server 30 can manage access from the terminal device 20 to thereby limit the number of times of giving services to each of the terminal devices 20.

Figure 12:
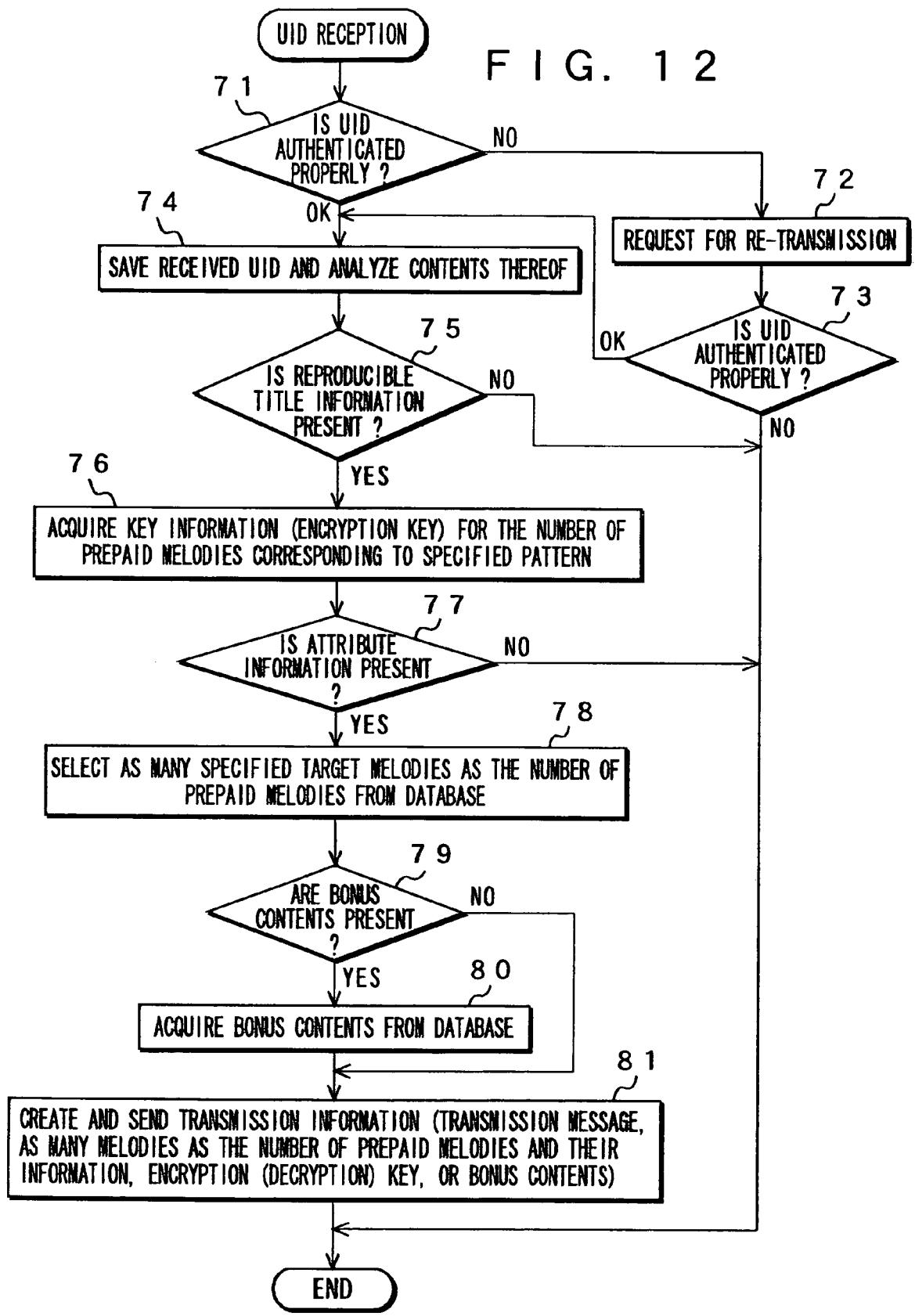
FIG. 12 is a flowchart for showing an example of processing on the side of a management server, which is a server device.

Next, a procedure for processing by the information service system to which the present invention can be applied will be described in detail with reference to FIG. 12 and the following. To simplify the description, first a procedure for processing by the managing server 30 will be described with reference to FIG. 12.

The managing server 30 first receives medium information UID read out of the optical disc 10a and transmitted from the terminal device 20 via the communication line network 40. It authenticates the received medium information UID and management information of the managing server 30 (step 71). That is, it verifies the medium information transmitted from the terminal device 20 on whether the medium information thus transmitted is legitimate medium information UID by utilizing a serial number serving as medium identification information contained in the medium information UID. If the transmitted medium information is not authenticated properly, the managing server 30 requests the terminal device 20 to re-transmit medium information UID and, based on the medium information UID re-transmitted from the terminal device 20, it performs authentication processing again (steps 72, 73). If the medium information UID is not decided to be authentic medium information UID in this second-time authentication processing, it stops the subsequent service processing. In this case, the server may stop the service processing by transmitting to the terminal device 20 a message indicating that the service is stopped because the medium information UID has not been authenticated properly.

If the medium information UID is authenticated properly, the serve saves the received medium information UID and analyzes contents of the medium information UID (step 74). If, as a result of analysis of the medium information UID, reproducible title information (the number of reproducible melodies) is confirmed first (step 75), key information for the number of prepaid melodies corresponding to a specified pattern is read out of the managing database unit 33 (step 76).

Next, it is checked whether attribute information of the medium information UID is present. If present, data relating to a target melody GP belonging to a specified group as many as the number of prepaid melodies is acquired from the database unit 32, and the acquired data is temporarily saved (steps 77, 78). Other attribute information of the medium information UID is also checked and, if there is any information indicating acquisition of bonus contents as the attribute information, the contents-data specified as service contents-data as bonuses is read out of the database unit 32 (steps 79, 80).

Then, based on the information and data read out of these database units 32 and 33, the server creates transmission information to be transmitted to the terminal device 20 (step 81). The transmission information refers to, as described above, information specified by medium information UID among the key information, the information to be downloaded, which belongs to the specified group, and the contents-data for service as bonuses. In an example relating to the present invention, before the managing server 30 transmits information to the terminal device 20, the server sends data about a transmission start message and then transmits transmission information and, when transmission of the transmission information ends, it sends to the terminal device 20 data relating to a transmission termination message indicating termination of transmission of the information from the managing server 30. In such a manner, start and termination of information transmission to the terminal device 20 becomes clear.

Figure 13:
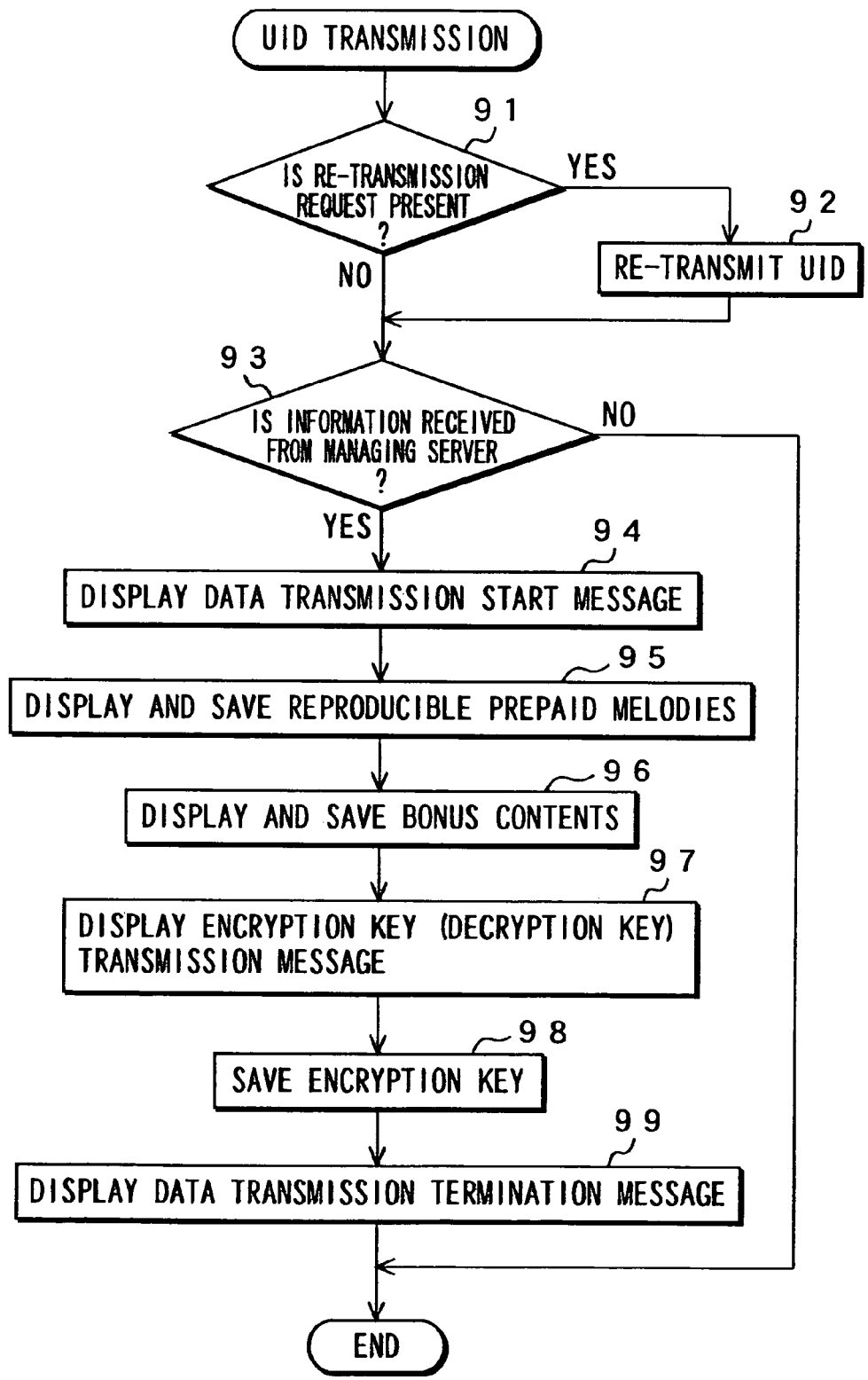
FIG. 13 is a flowchart for showing an example of processing on the side of a terminal device.

FIG. 13 is a flowchart for showing a procedure of processing on the side of the terminal device 20. If the managing server 30 requests re-transmission of medium information UID after the medium information UID has been transmitted to the managing server 30, the medium information UID is read out of the memory 63 and then, the read medium information UID is re-transmitted to the managing server 30 (steps 91, 92). Next, the device becomes ready for receiving information from the managing server 30, so that when having received information transmitted from the managing server 30, the device first displays a transmission start message on the display unit 25 based on data indicating transmission start transmitted from the managing server 30 (steps 93, 94). Then, if the information transmitted from the managing server 30 belongs to a specified group and should be downloaded, the device displays its reproducible information, for example, a prepaid melody title on the display unit 25 and temporarily saves the reproducible information in the memory 63 (step 95). The information saved in the memory 63 is then recorded on a recordable recording medium.

If the information transmitted from the managing server 30 is contents-data for a service as bonuses, the device displays on the display unit 25 an indication to the effect that the transmitted information is the contents-data for the service and saves the data in the memory 63 (step 96). It is also possible to additionally write the saved contents-data for the service as bonuses to the recording medium.

If the information transmitted from the managing server 30 is key information, the device saves the key information in the memory 63 (steps 97, 98). To reproduce information read out of the optical disc 10a, reproduction operation of the optical disc 10a is controlled using this key information. Then, based on data indicating termination of transmission transmitted from the managing server 30, the device displays a transmission termination message on the display unit 25 and then, a service reception mode of the terminal device 20 ends (step 99).

It is to be noted that the above-mentioned identification information UID can be recorded as a part of the above-mentioned TOC information in the PMA area 18 on the optical disc 10 serving as a recordable recording medium by using laser light emitted from a laser light source of the recording/reproducing device, that is, laser light which is used to record information in the program area. By performing complete processing or finalize processing on the optical disc 10, it is possible to record in the lead-in area 16 medium information recorded in the PMA area 18 as TOC information. The PMA area 18 in which TOC information is recorded temporarily is an area in which the user cannot record data by operating the recording/reproducing device.

According to the present invention, the above-mentioned identification information UID can be additionally recorded on a data-recorded recording medium shown in FIG. 2, that is, a reproduction-only recording medium on which information has been recorded by a plurality of pits beforehand. In this case, the medium information UID is recorded using, for example, high-power laser on the optical disc 10a on which information has been recorded beforehand. One example of the recording method will be described below with reference to FIG. 14 and the following.

Figure 14:
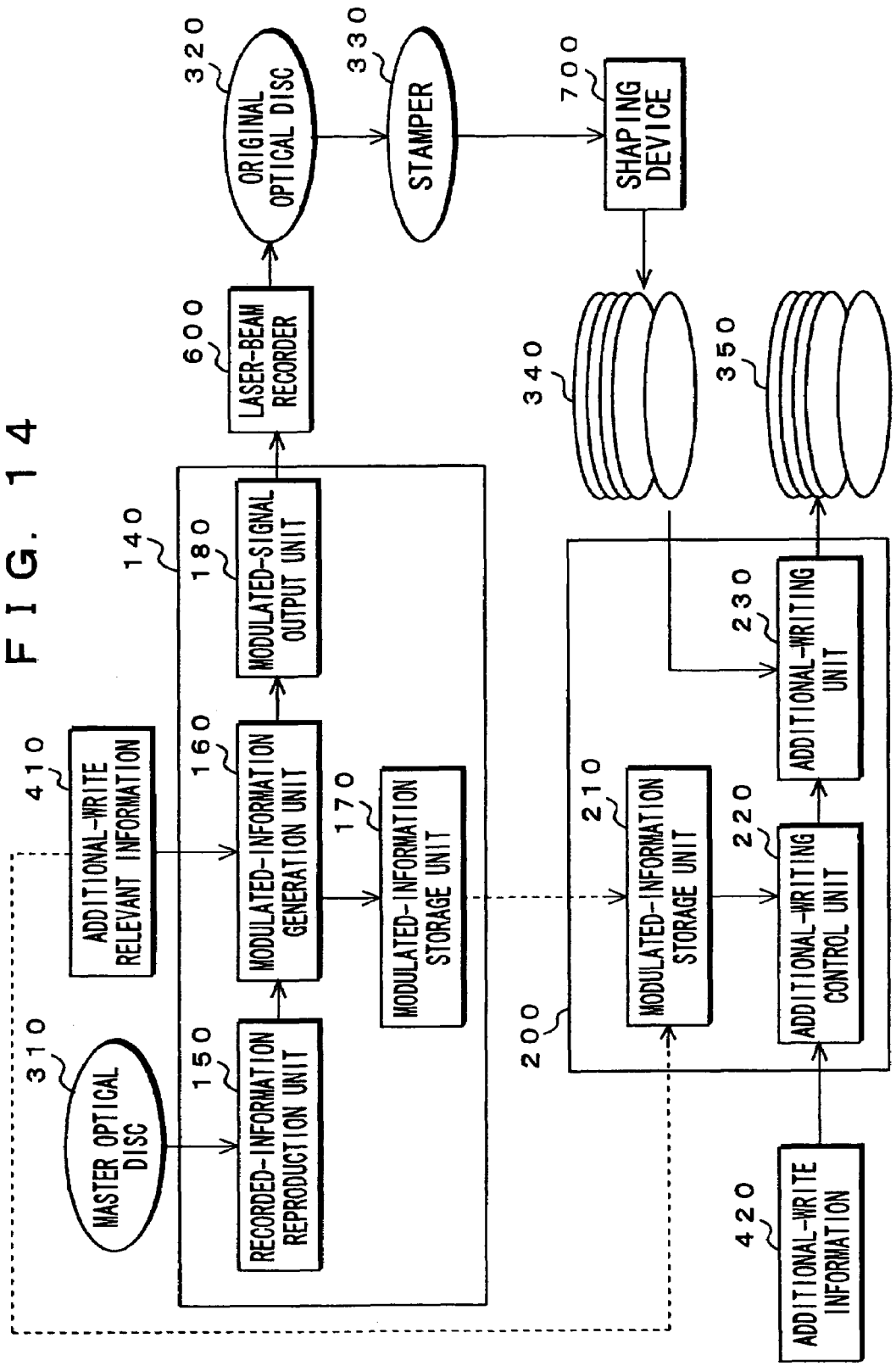
FIG. 14 is a system diagram for showing an embodiment of a recording device when medium information is recorded in a recorded recording medium.

FIG. 14 shows one example of an optical-disc creation system including a medium-information recording device. This optical-disc creation system comprises a modulated-signal delivery device 140 for modulating information to be recorded on the optical disc 10a which provides a finally finished product to generate a modulated signal and deliver it, a laser-beam recorder 600 which is an original optical-disc recording device for recording data on an original optical disc 320 according to the modulated signal, a shaping device 700 for shaping a disc substrate of a semi-finished optical disc 340, and a additional-writing device 200 for additionally writing data to the semi-finished optical disc 340. The additional-writing device 200 is used to record the above-mentioned medium information UID.

The modulated-signal delivery device 140 comprises a recorded-information reproduction unit 150 for reading and reproducing information to be recorded on an optical disc, a modulated-information generation unit 160 for converting information reproduced by the reproduction unit 150 into a modulated signal which is based on a predetermined modulation method, a modulated-information storage unit 170 for storing a modulated signal output from the generation unit 160, and a modulated-signal output unit 180 for outputting a modulated signal.

The recorded-information reproduction unit 150 sequentially reproduces predetermined information data recorded on all over the regions of a master optical disc 310, performs error correction processing etc. on the reproduced data, and then supplies it to the modulated-information generation unit 160. The master optical disc 310 is a recordable optical disc such as, for example, a CD-R disc, in which predetermined information to be recorded on an original optical disc 320 is recorded. The predetermined information is arbitrary information data such as music data, image data, or programs.

The modulated-information generation unit 160 converts information reproduced by the reproduction unit 150 into a modulated signal which is based on a predetermined modulation method predefined, writes a modulated signal obtained as a result of the conversion in the modulated-information storage unit 170 and supplies it to the modulated-signal output unit 180. The modulated signal is made up of a bit pattern comprising "1" or "0" prescribed by a predetermined modulation method. At time of modulation processing by the generation unit 160, as the occasion demands, additional-write relevant information 410 is referred which indicates specification of a region in which the medium information UID is to be written additionally, or the like.

The modulated-information storage unit 170 stores a modulated signal generated by the modulated-signal generation unit 160. The modulated-signal output unit 180 receives a modulated signal generated by the modulated-signal generation unit 160 and outputs a bit pattern comprising "1" or "0" to a laser-beam recorder 600 in synchronism with a predetermined clock.

The laser-beam recorder 600 irradiates an original optical disc 320 with laser light modulated on the basis of a modulated signal that is received from the modulated-signal delivery device 140, thereby performing cutting, that is, recording data on the original disc 320. This original optical disc 320 undergoes exposure processing and plating processing in this order, to provide a stamper 330.

The shaping device 700 performs, on this stamper 330, injection molding of a material of synthetic resin such as polycarbonate, thus forming a disc substrate which has an irregular pattern on its one surface. On the one surface of the formed disc substrate, a reflection film made of a material such as Al is adhered and, on the reflection film a protection film is formed to create a semi-finished optical disc 340. The semi-finished optical disc 340 refers to an optical disc on which data has been already recorded but medium information as additional-write information has not yet been recorded.

The additional-writing device 200 comprises a modulated-information storage unit 210 for storing additional-write relevant information 410 or a modulated signal supplied from the modulated-signal delivery device 140, an additional-writing control unit 220 for controlling additional-writing operations, and an additional-writing unit 230 for additionally writing medium information UID as additional-write information on the semi-finished optical disc 340 under the control of the additional-writing control unit 220.

The modulated-information storage unit 210 stores the additional-write relevant information 410 used by the modulated-signal delivery device 140 or a modulated signal supplied from the modulated-signal delivery device 140. The additional-writing control unit 220 controls, based on the additional-write relevant information 410 or the modulated signal, operations for calculating a region on the optical disc 340 in which additional-write information 420, which is medium information UID, is recorded and for additionally writing the additional-write information 420 stored in a memory, not shown, in this calculated region.

The additional-writing unit 230 comprises an additional-writing laser light source (not shown) for emitting high-power laser light. The additional-writing unit 230 records the additional-write information 420, which is medium information peculiar to the semi-finished optical disc 340 stored in the memory, not shown, on this optical disc by irradiating it with high-power laser light under the control of the additional-writing control unit 220, thus creating an optical disc 350 as a finished product on which the additional-write information 420 is recorded. This optical disc 350 refers to the optical disc 10a as a recording medium on which the above-mentioned medium information UID is recorded.

In the additional-writing device 200, the modulated-information storage unit 210 previously stores a modulated signal or the additional-write relevant information 410 used by the modulated-signal delivery device 140. Based on the additional-write relevant information 410 or the modulated signal, the additional-writing control unit 220 controls the additional-writing unit 230 so that a region of the optical disc 340 in which the additional information is to be recorded is calculated and the additional-write information 420 may be additionally recorded in this calculated region. The additional-writing unit 230 additionally records the additional-write information 420, which is medium information UID, on the semi-finished optical disc 340 under the control of the additional-writing control unit 220, thus creating the finished optical disc 350.

As a method for additionally writing additional-write information, a method is available for generating a modulation signal in which a un-modulation zone is provided in an arbitrary zone of the modulation signal when information is modulated in the modulated-signal delivery device to manufacture a semi-finished optical disc and recording additional-write information in the un-modulated zone at the additional-writing device, thus manufacturing an optical disc as a finished product.

FIG. 15 shows its one example. The modulated-signal delivery device 140 acquires from the additional-write relevant information 410 information required to insert an un-modulation zone in a signal modulated by an EFM method (hereinafter referred to as EFM data pattern). In this case, it is arbitrary and not specified which portion of the EFM data pattern the un-modulation zone is to be inserted or how often the un-modulation zone is to be inserted. However, in a case where several un-modulation zones are inserted or an un-modulation zone having a certain length is inserted, an interval at which the several un-modulation zones are inserted or a length of the un-modulation zone itself is set so that servo tracking of laser light may be possible, that is, the consecutive un-modulation zones may not exceed a servo tracking band when the additional-write information 420 is recorded by irradiating, with the laser light, the semi-finished optical disc 340 in which the un-modulation zones are inserted. A method for this servo tracking is not limited in particular.

In the example of FIG. 15, a sub-coding portion is set as a non-modulation zone. The un-modulation zone can be provided at an arbitrary location of a sub-decoding portion and a data portion where data is recorded excluding a synchronous pattern. Further, a plurality of un-modulation zones can be provided at a certain interval or at a random interval.

In accordance with such the additional-write relevant information 410, the modulated-information generation unit 160 generates a modulated signal (hereinafter referred to as EFM signal) in which an un-modulation zone is provided at a portion of an EFM data pattern and outputs it to the laser-beam recorder 600. An EFM signal which is output to the laser-beam recorder 600, that is, an EFM signal which is recorded on the original optical disc 320 has such a waveform that a signal level may be 0 at the sub-coding portion. As a result, no pit is present at the sub-decoding portion, which is an un-modulation zone on the semi-finished optical disc 340 as created.

In the additional-wiring device 200, it acquires the additional-write relevant information 410 and the modulated-information storage unit 210 stores the information. The additional-writing control unit 220 performs EFM modulation on the additional-write information 420 and forms pits in the sub-coding portion by controlling an additional-writing laser light source in the additional-writing unit 230 for emitting high-power laser so that the EFM-modulated additional-write information may be additionally recorded in a zone that corresponds to the sub-coding portion.

In FIG. 15, a hatched portion indicates a pit formed on the basis of the additional-write information 420. On the optical disc 350 as a finished product on which data is additionally written by the additional-writing device 200, in its zone corresponding to the sub-coding portion, the additional-write information 420 which has been modulated by the same modulation method that is used for information recorded in the program area of the optical disc 350 is recorded.

In such a manner, on a semi-finished optical disc having information recorded on it, additional-write information is recorded which has been modulated by the same modulation method as that employed to modulate information to be recorded on the optical disc. By recording different data of medium information as additional-write information on each different disc, it is possible to read it as information peculiar to the optical disc. If an optical disc product having medium information additionally written to it is mounted in a reproduction device that accommodates the conventional EFM modulation method, it is possible to reproduce information including contents recorded on the optical disc as well as the medium information given as additional-write information. It is thus possible to read medium information as information peculiar to an optical disc and reproduce the medium information without a necessity of providing the reproduction device with a special circuit for reproduction.

As the recording method for recording additional-write information such as medium information on a recorded recording medium, besides the above-mentioned example, there may be available such a method as to comprise the steps of manufacturing a semi-finished optical disc by generating an EFM signal which has undergone information modulation in the modulated-signal delivery device and manufacturing a finished optical disc by recording additional-write information in an arbitrary zone, for example, a zone where a particular data pattern is formed, as referencing an EFM data pattern generated by the modulated-signal delivery device in the additional-writing device, details of which are eliminated.

INDUSTRIAL APPLICABILITY

The present invention can be applied to a recording medium, a terminal device, and a server device which are used in an information service system in which the terminal device for receiving services and the server device for managing medium information in which contents-data as information is accumulated are connected to each other via a communication line network such as the Internet. Further, the present invention is applicable also to a method for transmitting information or for recording information in this service system.

The invention claimed is:

1. A recording medium, comprising:
an auxiliary region wherein no data can be re-recorded;
a lead-in region;
a recording region in which a plurality of pieces of information is recorded; and
a lead-out region,
wherein medium information is recorded in at least any one of said auxiliary region, said lead-in region, said recording region, and said lead-out region, said medium information including
medium identification information used to authenticate the recording medium at a remote managing server over a communication network, and
relevant information including a pattern identifying a subset of pieces of information as the only pieces that may be reproduced from the plurality of pieces of information recorded in the recording region, information used to decide whether said recording medium is an authentic recoding medium, information for controlling reproduction of information recorded on said recording medium, and information that indicates a classification of said recording medium, the classification indicating whether said recording medium cannot be recorded, can be recorded once, or can be recorded more than once.

2. The recording medium according to claim 1, wherein information recorded in said recording region is encrypted and recorded, and said relevant information includes key information for decrypting said information thus encrypted and recorded.

3. The recording medium according to claim 1, wherein information recorded in said recording region is encrypted and recorded, and said relevant information includes information for generating key information required to decrypt said information thus encrypted and recorded.

4. The recording medium according to claim 1, wherein said relevant information includes information that indicates a classification of information which is recorded in said recording region.

5. The recording medium according to claim 1, wherein said relevant information includes information that indicates whether contents-data of a service provided by the remote managing server can be obtained.

6. The recording medium according to claim 1, wherein a plurality of irregular patterns based on the medium information are stamped in said recording region.

7. The recording medium according to claim 6, wherein said medium information is additionally written with a laser beam on said recording medium.

8. An information transmission method, comprising:
transmitting, over a communication network from a terminal device to a server device, medium information read out of a recording medium comprising a lead-in region, a recording region in which information is recorded, and a lead-out region, wherein said medium information is recorded in at least any one of said lead-in region, said recording region, and said lead-out region, and said medium information includes medium identification information used to authenticate the recording medium at a remote managing server over a communication network, and relevant information including a pattern identifying a subset of pieces of information on the recording medium as the only pieces that may be reproduced from a plurality of pieces of information recorded in the recording region, and a classification indicating whether said recording medium cannot be recorded, can be recorded once, or can be recorded more than once;
causing said server device to verify said transmitted medium information and authenticate said transmitted medium information by comparing the classification and the medium identification against a database on the server device;
transmitting over a communication network to said terminal device information specified on the basis of said relevant information included in said medium information;
prior to transmitting the specified information based on said relevant information, transmitting from said server device to said terminals device data that indicates starting of transmission of said specified information and then transmitting said specified information;
terminating transmission of the information specified on the basis of said relevant information; and
transmitting from said server device to said terminal device data that indicates the termination of the transmission of said specified information.

9. The information transmission method according to claim 8, comprising the step of transmitting from said server device to said terminal device information required to reproduce information recorded in said recording region of said recording medium based on said relevant information.

10. The information transmission method according to claim 9, wherein said information required for the reproduction is key information.

11. The information transmission method according to claim 8, wherein said relevant information includes information that indicates whether contents-data of a service can be obtained, the method further comprising:
deciding whether said information indicates that said contents-data of the service included in said relevant information can be obtained; and
transmitting said contents-data of the service from said server device to said terminal device.

12. The information transmission method according to claim 8, further comprising:
detecting whether said transmitted medium information is authenticated improperly; and
requesting for re-transmission of said medium information from said server device to said terminal device.

13. The information transmission method according to claim 12, further comprising:
detecting whether medium information re-transmitted from said terminal device is authenticated improperly; and
stopping processing.

14. A terminal device, comprising:
a head portion configured to read out information recorded on a recording medium comprising an auxiliary region wherein no data can be re-recorded, a lead-in region, a recording region wherein a plurality of pieces of information is recorded, and a lead-out region, wherein medium information including medium identification information and relevant information including a pattern identifying a subset of pieces of information as the only pieces that may be reproduced from the plurality of pieces of information recorded in the recording region, is recorded in at least any one of said lead-in region, said recording region, and said lead-out region;
a decode processing portion configured to perform decode processing on an output signal provided from said head portion;
an extraction portion configured to extract said medium information from an output signal provided from said decode processing portion;
a transmission-and-reception portion configured to transmit said medium information extracted by said extraction portion over a communication network and to receive information transmitted from an outside over the communication network; and
a control portion configured to perform an operation control based on the information read out of said lead-in region of said recording medium by said head portion and the information received by said transmission-and-reception portion,
a storage portion, wherein said control portion is further configured to control reproduction operation of said recording medium based on information necessary for reproducing the information recorded in said recording region of said recording medium and received by said transmission-and-reception portion,
said control portion allows to be written in said storage portion information necessary for reproducing the information recorded in said recording region of said recording medium, and
said control portion allows said storage portion to store received contents-data for a service, said contents-data for the service being the information received by said transmission-and-reception portion.

15. The terminal device according to claim 14, further comprising a storage portion configured to store the medium information extracted by said extraction portion.

16. The terminal device according to claim 14 further comprising a display portion, wherein said control portion causes said display portion to provide a display based on information necessary for reproducing said information thus received and recorded in said recording region of said recording medium.

17. The terminal device according to claim 14, wherein said control portion allows said transmission-and-reception portion to re-transmit said medium information.

18. A server device, comprising:
a transmission-and-reception portion configured to receive and transmit medium information over a communication network after being read out of a recording medium, said recording medium comprising a lead-in region, a recording region wherein a plurality of pieces of information is recorded, and a lead-out region, wherein said medium information including medium identification information and relevant information including a pattern identifying a subset of pieces of information as the only pieces that may be reproduced from the plurality of pieces of information recorded in the recording region, is recorded in at least any one of said lead-in region, said recording region, and said lead-out region;

a management information storage portion in which management information including said medium information is stored;

a storage portion in which information specified by said relevant information is stored; and a control portion configured to authenticate said medium information received over a communication network by said transmission-and-reception portion based on said medium information thus received and said medium information stored in said management information storage portion, and configured to allow information specified on the basis of said relevant information included in said medium information to be read out of said storage portion, after said received medium information is properly authenticated, and to cause said transmission-and-reception portion to transmit said specified information, wherein said relevant information includes information that indicates whether contents-data for a service can be obtained, said contents-data for the service being stored in said storage portion, said control portion decides information that indicates whether the contents-data for the service can be obtained, said information being included in said relevant information, and said control portion allows said contents-data for the service to be read out of said recording portion and the read contents-data to be transmitted from said transmission-and-reception portion.

19. The server device according to claim 18, wherein said control portion allows information necessary for reproducing information recorded in said recording region of said recording medium to be read out of said storage portion based on said relevant information included in said received medium information and the read information to be transmitted from said transmission-and-reception portion.

20. The server device according to claim 19, wherein said information necessary for reproduction is key information.

21. The server device according to claim 18, wherein said control portion allows a signal that requests for re-transmission of said medium information to be transmitted from said transmission-and-reception portion in response to said received medium information being authenticated improperly.

22. The server device according to claim 21, wherein said control portion stops processing in response to said re-transmitted medium information being authenticated improperly.

23. The server device according to claim 18, wherein said control portion allows data that indicates starting of transmission of information specified on the basis of said relevant information to be transmitted from said transmission-and-reception portion, prior to transmitting said specified information, and then said control portion allows said specified information to be transmitted from said transmission-and-reception portion.

24. The server device according to claim 23, wherein said control portion allows data that indicates termination of transmission of said specified information to be transmitted from said transmission-and-reception portion in response to termination of transmission of said information specified on the basis of said relevant information.

25. The server device according to claim 18, wherein the control portion is configured to authenticate said medium information by comparing medium classification indicating whether said recording medium cannot be recorded, can be recorded once, or can be recorded more than once, and medium identification information against information stored in the storage portion.

* * * * *